US008883366B2

(12) United States Patent
Ohmori et al.

(10) Patent No.: US 8,883,366 B2
(45) Date of Patent: Nov. 11, 2014

(54) DEVICE WITH CERAMIC THIN PLATE MEMBER AND METAL THIN PLATE MEMBER

(75) Inventors: Makoto Ohmori, Nagoya (JP); Natsumi Shimogawa, Nagoya (JP); Tsutomu Nanataki, Toyoake (JP); Hiroki Fujita, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 1865 days.

(21) Appl. No.: 11/859,102

(22) Filed: Sep. 21, 2007

(65) Prior Publication Data
US 2008/0124601 A1  May 29, 2008

(30) Foreign Application Priority Data

Nov. 27, 2006 (JP) ................. 2006-318373
Aug. 17, 2007 (JP) ................. 2007-212850

(51) Int. Cl.
H01M 8/10 (2006.01)
H01M 8/14 (2006.01)
H01M 8/24 (2006.01)
H01M 8/02 (2006.01)
H01M 8/12 (2006.01)

(52) U.S. Cl.
CPC .......... *H01M 8/0273* (2013.01); *H01M 8/2425* (2013.01); *H01M 8/0289* (2013.01); *Y02E 60/50* (2013.01); *H01M 2008/1293* (2013.01); *H01M 8/1253* (2013.01); *Y02E 60/525* (2013.01)
USPC ............ 429/465; 429/468; 429/469; 429/479

(58) Field of Classification Search
None
See application file for complete search history.

(56) References Cited

U.S. PATENT DOCUMENTS 5,460,897 A * 10/1995 Gibson et al. ................. 429/461
6,593,020 B1 * 7/2003 Yoo et al. ...................... 429/496
2003/0096147 A1  5/2003 Badding et al.

FOREIGN PATENT DOCUMENTS

JP  2000-331692 A1  11/2000
JP  3466960 B2  8/2003
JP  2005-322451 A1  11/2005

* cited by examiner

*Primary Examiner* — Barbara Gilliam
*Assistant Examiner* — Adam A Arciero
(74) *Attorney, Agent, or Firm* — Burr & Brown, PLLC

(57) ABSTRACT

A device includes a ceramic thin plate member including a fired ceramic sheet; and a metal thin plate member having an outer shape larger than that of the ceramic thin plate member. An outer circumferential portion of the ceramic thin plate member is joined to the metal thin plate member. The ceramic thin plate member has through holes and a plurality of crease portions. Each crease portion has a ridge portion whose crest continuously extends from a joint portion between the ceramic thin plate member and the metal thin plate member toward an outer circumferential portion of the metal thin plate member. Since thermal stress due to a difference in thermal expansion between the metal thin plate member and the ceramic thin plate member can be relaxed through expansion of the crease portions, the ceramic thin plate member does not deform.

13 Claims, 13 Drawing Sheets

DEVICE WITH CERAMIC THIN PLATE MEMBER AND METAL THIN PLATE MEMBER

BACKGROUND OF THE INVENTION

1. Field of the Invention

The present invention relates to a device which includes a ceramic thin plate member, containing a fired ceramic sheet, and a metal thin plate member supporting the ceramic thin plate member and which is used in, for example, solid oxide fuel cells.

2. Background of the Invention

Conventionally, a thin plate member containing a fired ceramic sheet (hereinafter also referred to as a "ceramic thin plate member") has been used in various apparatuses (devices) such as sensors, actuators, and solid oxide fuel cells (SOFCs). For example, when a ceramic thin plate member is applied to an SOFC, the ceramic thin plate member is composed of a solid electrolyte layer of zirconia, which is a ceramic; a fuel electrode layer formed on one face of the solid electrolyte layer; and an air electrode layer formed on the other face of the solid electrolyte layer. Further, a fuel passage or channel is formed to face the fuel electrode layer, and an air passage or channel is formed to face the air electrode layer. Such a ceramic thin plate member for SOFC is joined to a holding frame formed of a thin metal plate (hereinafter also referred to as a "metal thin plate member") at the periphery thereof, and is held by the metal thin plate member. An outer circumferential portion of the metal thin plate member is supported by a support member.

The metal thin plate member has a curved portion formed through press working or the like. The curved portion is formed to surround the perimeter of the ceramic thin plate member. In other words, the curved portion is formed on the metal thin plate member such that the crest of the curved portion extends continuously so as to form a ridge portion, and the ridge portion surrounds the ceramic thin plate member (the circumference thereof) (see, for example, Japanese Patent No. 3466960, FIG. 6).

Incidentally, in some cases, for example, when an SOFC is caused to quickly start power generation, the temperature of a device (a ceramic thin plate member and a metal thin plate member) changes sharply. As a result, a difference in thermal expansion is produced between the ceramic thin plate member and the metal thin plate member. A thermal stress generated due to the difference in thermal expansion mainly acts on a joint portion between the ceramic thin plate member and the metal thin plate member and/or on the ceramic thin plate member. Although the above-described conventional metal thin plate member has the curved portion, the metal thin plate member cannot deform to sufficiently relax the thermal stress acting on the joint portion and/or on the ceramic thin plate member, because the crest (ridge portion) of the curved portion is formed to surround the ceramic thin plate member. Therefore, in some cases, the joint portion between the ceramic thin plate member and the metal thin plate member and/or the ceramic thin plate member may be broken.

Further, in the conventional metal thin plate member, since the curved portion is formed to surround the ceramic thin plate member, the curved portion hardly functions to improve the rigidity of the metal thin plate member in a direction perpendicular to the plane of the ceramic thin plate member. Therefore, when the curved portion thermally expands and relaxes the above-mentioned thermal stress, the curved portion deforms not only in a direction within the plane of the ceramic thin plate member but also in a direction perpendicular to the plane of the ceramic thin plate member. As a result, the thermally expanded curved portion is likely to move the ceramic thin plate member in the direction perpendicular to the plane of the ceramic thin plate member. Accordingly, even in a case where the joint portion and/or the ceramic thin plate member is not broken, there may arise a problem that the ceramic thin plate member moves or deforms in a direction perpendicular to its plane, and closes a corresponding fuel passage or air passage. Moreover, even in a case where the ceramic thin plate member moves or deforms to a degree such that the fuel passage or air passage is not completely closed, there may arise a problem that the moved or deformed ceramic thin plate member increases the pressure loss of fuel, the loss being produced when the fuel flows through the fuel passage, and/or the pressure loss of fluid, such as air, the pressure loss being produced when the fluid flows through the air passage.

If the joint portion is broken or the ceramic thin plate member deforms as described above, the apparatus has lower the performance or lower reliability.

SUMMARY OF THE INVENTION

Accordingly, one of objects of the present invention is to provide an improved device which includes a ceramic thin plate member and a metal thin plate member supporting the ceramic thin plate member and which enables an apparatus including the device to consistently exhibit a desired performance even when the temperature of the device changes.

In order to achieve the above-described object, a device according to the present invention comprises a ceramic thin plate member including a fired ceramic sheet; and a metal thin plate member having an outer shape larger than that of the ceramic thin plate member. An outer circumferential portion of the ceramic thin plate member is joined to the metal thin plate member. A plurality of crease portions are formed on the metal thin plate member (i.e., the metal thin plate member has a plurality of crease portions). Each crease portion has a ridge portion whose crest continuously extends from a joint portion between the ceramic thin plate member and the metal thin plate member toward an outer circumferential portion of the metal thin plate member.

That is, in this device, the crease portions (swell portions or curved portions) of the metal thin plate member are formed such that the ridge portions of the crease portions extend generally radially in the plan view. Accordingly, the crease portions effectively relax thermal stresses acting on the above-described joint portion and the ceramic thin plate member. Further, the plurality of crease portions also function as ribs (reinforcing portions) for increasing the rigidity of the metal thin plate member (and further the rigidity of the ceramic thin plate member) with respect to a direction perpendicular to a plane formed by the ceramic thin plate member and the metal thin plate member. Accordingly, it is possible to avoid breakage of the joint portion between the ceramic thin plate member and the metal thin plate member, and to suppress the above-described movement or deformation of the ceramic thin plate member. As a result, an apparatus to which the device is applied can exhibit a desired performance in a consistent manner. Notably, the outer circumferential portion of the ceramic thin plate member serving as the joint portion may or may not include the peripheral edge of the ceramic thin plate member.

The metal thin plate member may have a single through-hole in a region located inside the joint portion between the ceramic thin plate member and the metal thin plate member.

This single through-hole may be a large hole surrounded by the joint portion (or a large hole whose perimeter extends along the inner perimeter of the joint portion). In this case, the metal thin plate member can be called a frame of metal thin plate. Further, the metal thin plate member may be configured such that a separate member having a mesh structure or having a plurality of through-holes is disposed to cover the single through-hole and is held by the metal thin plate member.

Alternatively, the metal thin plate member may have a plurality of through-holes in a region located inside the joint portion between the ceramic thin plate member and the metal thin plate member. The phrase "a plurality of through-holes" encompasses a plurality of openings of a mesh structure formed in a region of the metal thin plate member located inside the joint portion. By virtue of the plurality of through-holes provided in the metal thin plate member, fluid necessary to reach the ceramic thin plate member can be supplied sufficiently through the plurality of through-holes to the ceramic thin plate, and electrons or the like can be collected efficiently by portions of the metal thin plate member other than the plurality of through-holes.

Through experiments, it was found that the above-described movement or deformation of the ceramic thin plate member can be suppressed effectively, when the device has the following features.
(1) The ridge portion of each crease portion extends at an angle within a range of 45 degrees to 135 degrees inclusive, in relation to a corresponding tangential line of the outer circumferential edge of the ceramic thin plate member. In other words, the extending angle of the ridge portion of each crease portion is within a range of ±45 degrees in relation to a corresponding normal line of the outer circumferential edge of the ceramic thin plate member. Notably, the metal thin plate member may have crease portions each having an extending angle fall outside this angle range.
(2) The ceramic thin plate member has a thickness within a range of 20 µm to 200 µm inclusive, and the metal thin plate member has a thickness within a range of 20 µm to 80 µm inclusive.
(3) The crease height, which is a vertical distance between an upper crest of a crease portion and a lower crest of a crease portion adjacent thereto, is within a range of 10 µm to 70 µm inclusive.
(4) The distance between the crests of two crease portions adjacent to each other is within a range of 1 mm to 4 mm inclusive, as measured at a position 0.5 mm separated from an end portion of the ceramic thin plate member toward the outer circumferential portion of the metal thin plate member.

In one embodiment of the device according to the present invention, the metal thin plate member and the outer circumferential portion of the ceramic thin plate member are desirably joined by glass or brazing filler metal.

When the metal thin plate member and the ceramic thin plate member are joined by use of glass or brazing filler metal, the metal thin plate member and the ceramic thin plate member are heated to a predetermined high temperature, so that the metal thin plate member and the ceramic thin plate member expand by respective amounts corresponding to their coefficients of thermal expansion. The metal thin plate member and the ceramic thin plate member, which are in an expanded state, are joined together through hardening of the glass or brazing filler metal when the temperature lowers. Since the metal thin plate member and the ceramic thin plate member contract by different amounts in response to the temperature decrease, a thermal stress is mainly generated at the joint portion between the two members. As a result, the metal thin plate member, which deforms more easily than the ceramic thin plate member, deforms greatly, so that the above-described plurality of crease portions are formed on (or in) the metal thin plate member. Accordingly, when the temperature of the device composed of the ceramic thin plate member and the metal thin plate member having the plurality of crease portions formed as described above is increased from room temperature, a thermal stress generated due to the temperature increase is relaxed through expansion of a portion of the crease portions. That is, the metal thin plate member deforms such that it returns to the temperature-elevated state (or heated state) before the joining process. As a result, even when the temperature of the device is repeatedly increased and decreased, no excessive thermal stress repeatedly acts on the joint portion and/or the ceramic thin plate member. Therefore, the device has a considerably high level of durability.

The ceramic thin plate member may be a single-layer thin plate or a laminate including a plurality of thin plates. If the ceramic thin plate member is the laminate including a plurality of thin plates, the ceramic thin plate member may be a laminate including the above-described ceramic sheet and additional sheets (or an additional sheet) each formed of a material having a coefficient of thermal expansion different from that of the ceramic sheet.

In this case, so as to construct an SOFC, the ceramic thin plate member may include a solid electrolyte layer serving as the ceramic sheet; a fuel electrode layer formed on one face of the solid electrolyte layer and serving as one of the additional sheets; and an air electrode layer formed on the opposite face of the solid electrolyte layer and serving as the other additional sheet.

The fuel electrode layer and/or the air electrode layer may be formed integrally with the ceramic sheet through firing or may be formed on the ceramic sheet through any other film forming process.

When the ceramic thin plate member includes the solid electrolyte layer, the fuel electrode layer, and the air electrode layer, the device desirably includes first and second support members. The first support member has a flat portion, an upper frame portion projecting toward the upper side of the flat portion and surrounding the flat portion, and a lower frame portion projecting toward the lower side of the flat portion and surrounding the flat portion. The second support member has a flat portion, an upper frame portion projecting toward the upper side of the flat portion and surrounding the flat portion, and a lower frame portion projecting toward the lower side of the flat portion and surrounding the flat portion. That, is the second support member has the same structure as the first support member.

The first and second support members are disposed and aligned (coaxially to each other) such that the lower frame portion of the second support member is located above the upper frame portion of the first support member to face the upper frame portion.

The metal thin plate member is sandwiched between the upper frame portion of the first support member and the lower frame portion of the second support member so that the air electrode layer of the ceramic thin plate member faces an upper surface of the flat portion of the first support member and the fuel electrode layer of the ceramic thin plate member faces a lower surface of the flat portion of the second support member.

The upper surface of the flat portion of the first support member, an inner wall surface of the upper frame portion of the first support member, and the air electrode layer of the ceramic thin plate member define an air channel to which a gas containing oxygen is supplied.

The lower surface of the flat portion of the second support member, an inner wall surface of the lower frame portion of the second support member, and the fuel electrode layer of the ceramic thin plate member define a fuel channel to which a fuel is supplied.

Through stacking of such devices, a downsized SOFC of a plate stack type is provided. Since the ceramic thin plate member hardly moves or deforms due to presence of the crease portions of the metal thin plate member, there can be provided a downsized SOFC in which the fuel channel or the air channel is not narrowed through movement or deformation of the ceramic thin plate member.

More specifically, an SOFC generates electrical power in accordance with, for example, the following reaction formulas (1) and (2).

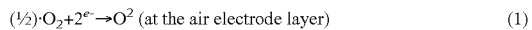
$$(½)·O_2+2e^- \rightarrow O^{2-} \text{ (at the air electrode layer)} \quad (1)$$

$$H_2+O^{2-} \rightarrow H_2O+2e^- \text{ (at the fuel electrode layer)} \quad (2)$$

That is, in this reaction, oxygen of 0.5 mol is required for hydrogen of 1 mol. Meanwhile, since air supplies oxygen, when the amount of oxygen contained within air is considered, the amount of air required for power generation is 2.5 times the amount of hydrogen. That is, in order to generate electrical power, a single ceramic thin plate member with the fuel electrode layer and the air electrode layer requires hydrogen and air of amounts that greatly differ from each other. Moreover, since oxygen molecules are larger than hydrogen molecules, the speed at which oxygen molecules diffuse in the air electrode layer (accordingly, reaction efficiency) is smaller than the speed at which hydrogen molecules diffuse in the fuel electrode layer. Therefore, a much greater amount of oxygen (accordingly, air) must be supplied to the space (air channel) on the air electrode layer side. As can be understood from the above, in many cases, a large difference is produced between "the pressure generated in the space adjacent to the fuel electrode layer (fuel channel or hydrogen channel), the pressure acting on the ceramic thin plate member" and "the pressure generated in the space adjacent to the air electrode layer (air channel), the pressure acting on the ceramic thin plate member". Accordingly, the ceramic thin plate member used in an SOFC always receives forces whose direction is perpendicular to the plane of the thin plate member. Thus, if the device of the present invention in which the ceramic thin plate member hardly moves or deforms is applied to an SOFC, the durability of the SOFC can be improved greatly.

It should be noted that the ceramic thin plate member in the present invention may assume (or has) any outer or perimetric shape in its plan view, such as a circular shape, an elliptical shape, an oval shape, a polygonal shape (e.g., square or hexagon), or a polygonal shape with rounded corners. Irrespective of the perimetric shape of the ceramic thin plate member, the metal thin plate member may assume (or has) any outer or perimetric shape in its plan view, such as a circular shape, an elliptical shape, an oval shape, a polygonal shape (e.g., square or hexagon), or a polygonal shape with rounded corners.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE INVENTION

A device according to an embodiment of the present invention will next be described with reference to the drawings. This device is applied to various apparatuses such as sensors, actuators, and solid oxide fuel cells. In the following embodiment, the device is applied to a solid oxide fuel cell (hereinafter may be simply referred to as a "fuel cell").

Figure 1:
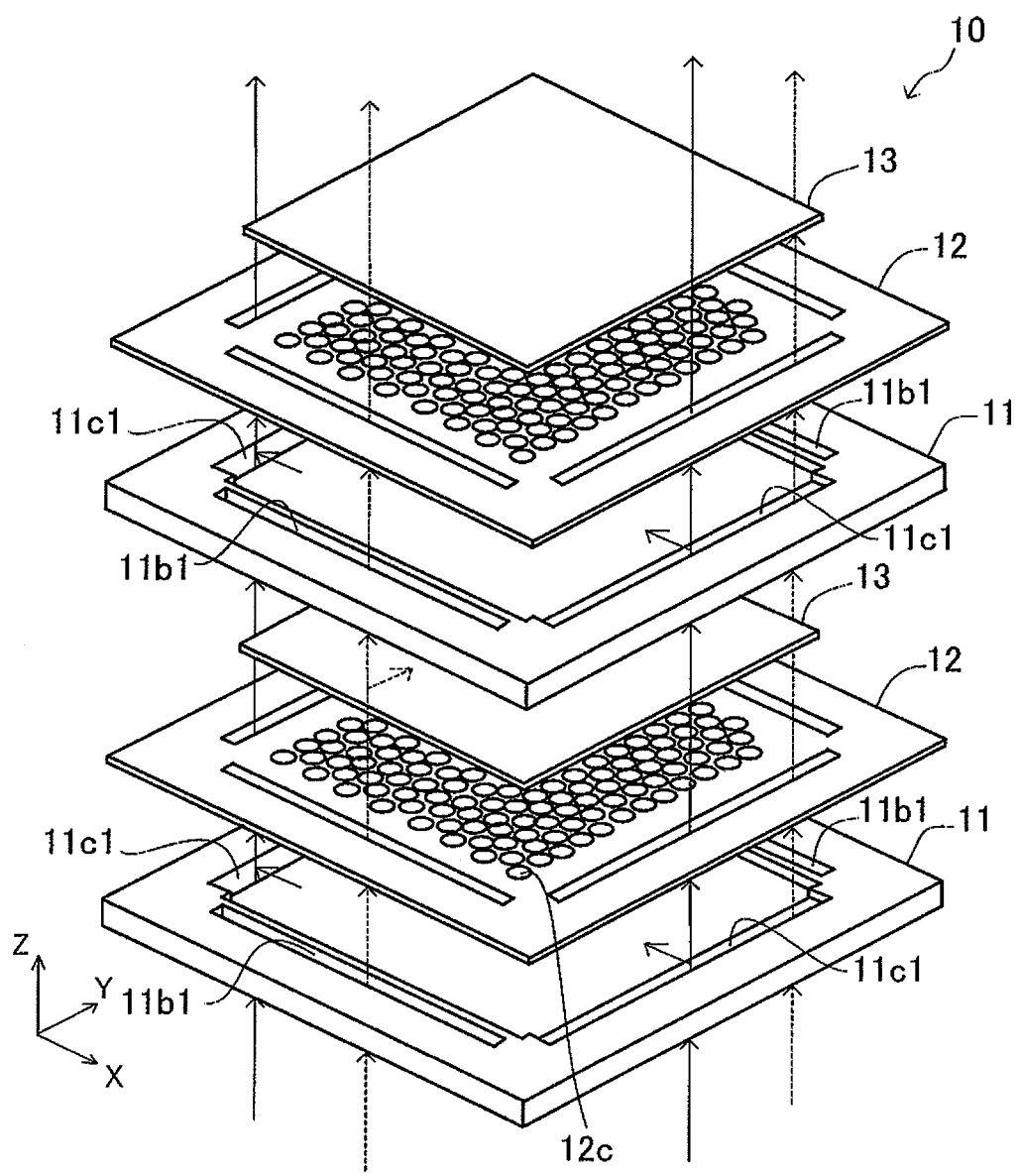
FIG. 1 is a partially exploded perspective view of a solid oxide fuel cell which includes a device according to an embodiment of the present invention.
Figure 2:
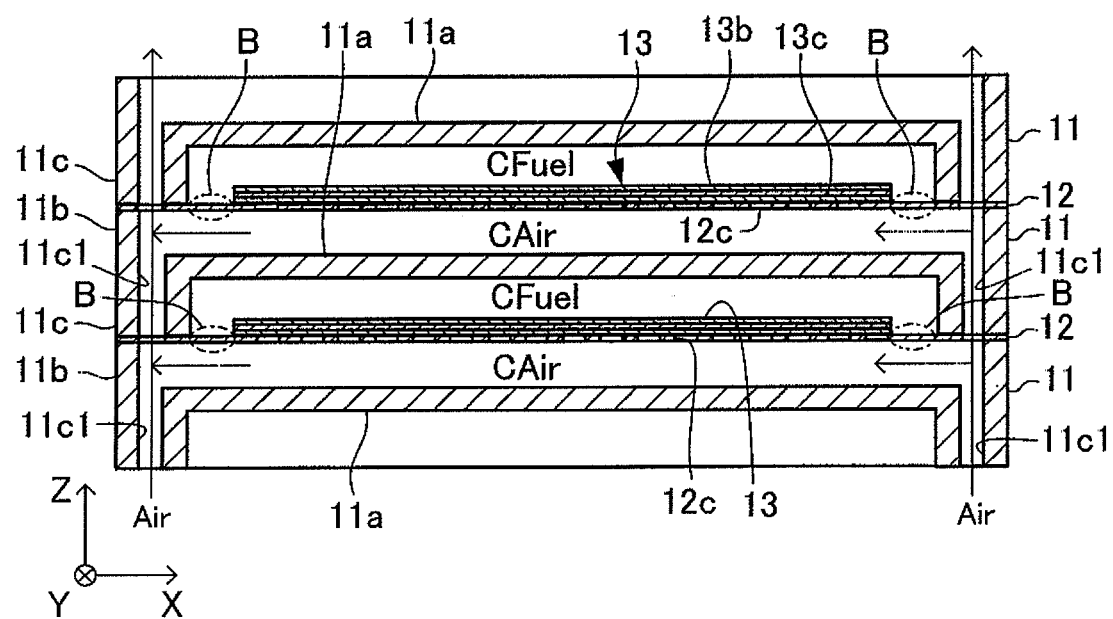
FIG. 2 is a partial vertical cross-sectional view of the fuel cell shown in FIG. 1.

Structure of Fuel Cell:

FIG. 1 is a partially exploded perspective view of a solid oxide fuel cell (fuel cell) 10 to which the device according to the embodiment of the present invention is applied. The fuel cell 10 includes a plurality of support members 11, a plurality of metal thin plate members 12, and a plurality of ceramic thin plate members 13. As shown in FIG. 1 and FIG. 2 which is a partial cross-sectional view of the fuel cell 10, the fuel cell 10 is assembled through alternate stacking of the support members 11 and the metal thin plate members 12 each of which supports the corresponding ceramic thin plate member 13 on the upper side thereof. That is, the fuel cell 10 has a stack structure.

Each support member 11 is formed of a ferritic SUS (stainless steel) or a Ni-based heat resisting alloy (e.g., Inconel 600, Hastelloy, or the like). The support member 11 is also called an "interconnector." As shown in FIG. 3, which is a plan view of the support member 11, and FIGS. 4 to 6, which are cross-sectional views taken along line 4-4, line 5-5, and line 6-6, respectively of FIG. 3, the support member 11 has a flat portion 11a, an upper frame portion 11b, and a lower frame portion 11c.

The flat portion 11a assumes the form of a thin flat plate whose thickness direction is parallel to a Z-axis direction. A planar shape of the flat portion 11a is a square having sides extending along X-axis and Y-axis directions, which are orthogonal to each other. The Z axis is orthogonal to a plane including the X axis and the Y axis.

Figure 4:
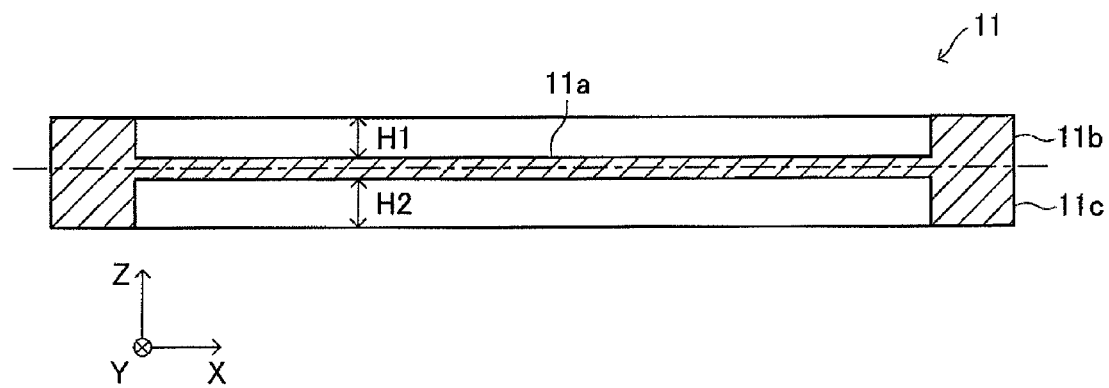
FIG. 4 is a cross-sectional view of the support member taken along line 4-4 of FIG. 3.

The upper frame portion 11b extends toward the upper side of the flat portion 11a in a region surrounding the flat portion 11a (a region near the four sides or a region near the perimeter). As shown in FIG. 4, the height of the upper frame portion 11b as measured from the upper surface of the flat portion 11a is H1.

Figure 3:
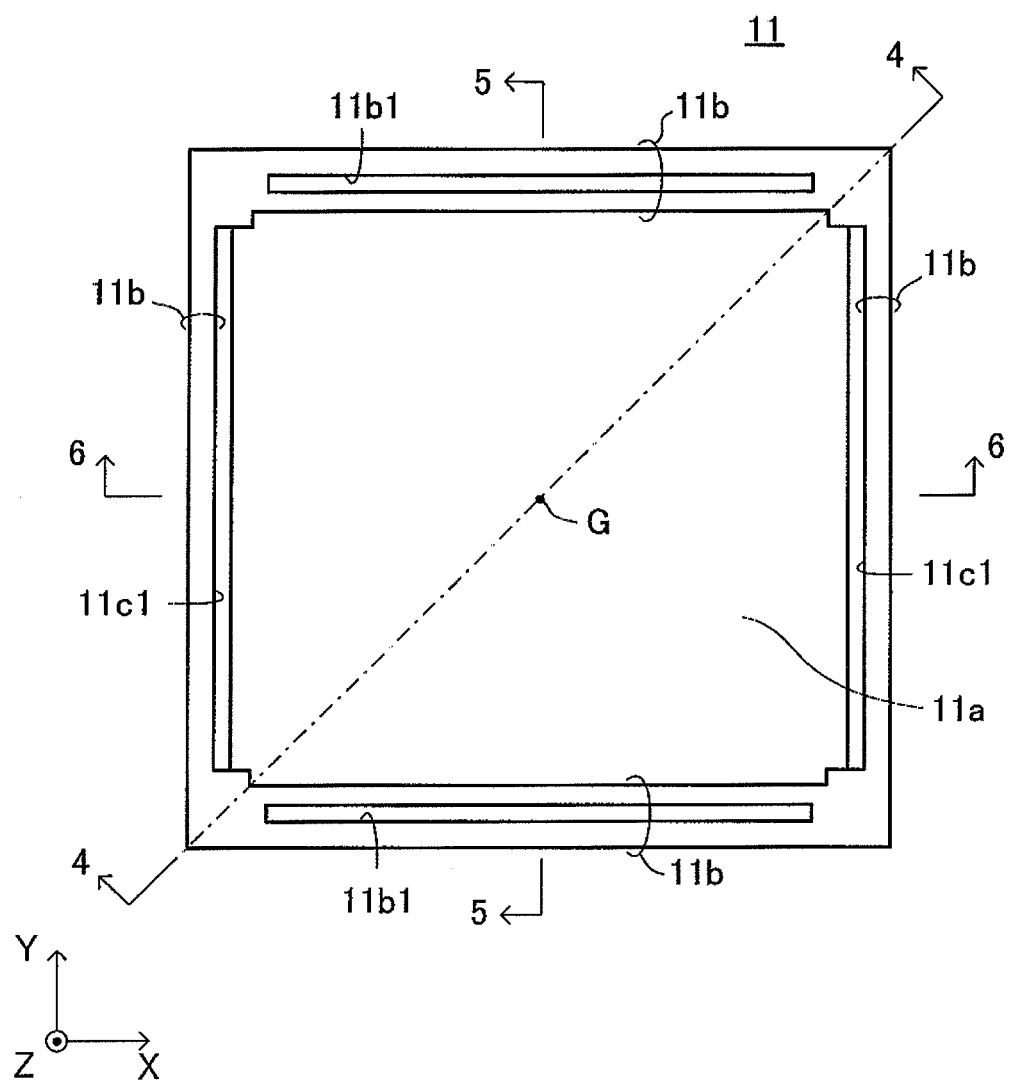
FIG. 3 is a plan view of a support member shown in FIG. 1.
Figure 5:
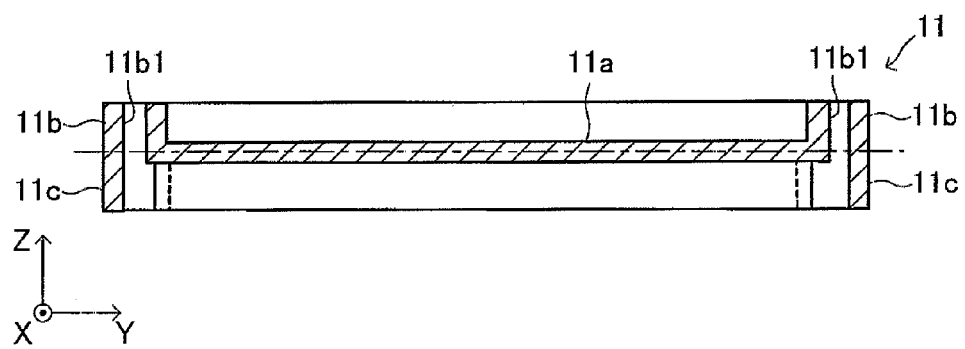
FIG. 5 is a cross-sectional view of the support member taken along line 5-5 of FIG. 3.

As shown in FIGS. 3 and 5, each portion of the upper frame portion 11b extending along the X axis has a rectangular cross section having sides which are parallel to the Y axis and the Z axis, respectively. A slit 11b1 extending along the X axis (slit 11b1 whose longitudinal direction coincides with the X axis direction) is formed in the portion of the upper frame portion 11b extending along the X axis.

Figure 6:
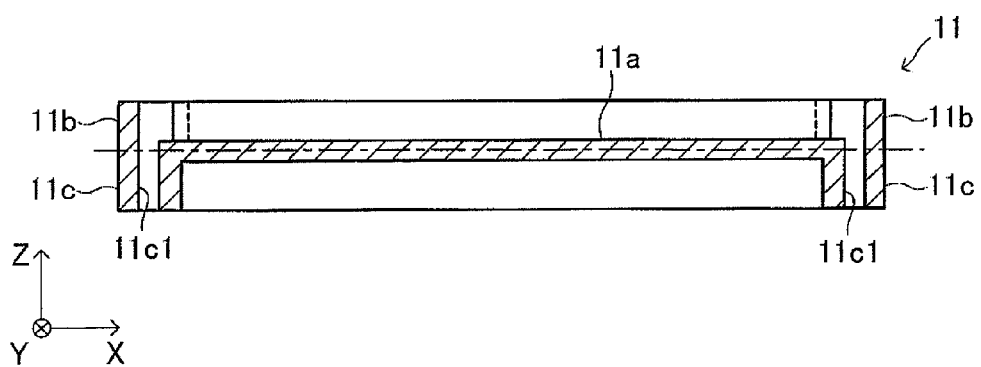
FIG. 6 is a cross-sectional view of the support member taken along line 6-6 of FIG. 3.

As shown in FIGS. 3 and 6, each portion of the upper frame portion 11b extending along the Y axis has a rectangular cross section having sides which are parallel to the X axis and the Z axis, respectively. This portion of the upper frame portion 11b extending along the Y axis has the same shape as a part of the portion of the upper frame portion 11b extending along the X axis, the part remaining after removal of an inner vertical wall part which partially forms the slit 11b1 from the upper frame portion 11b extending along the X axis.

The lower frame portion 11c extends toward the lower side of the flat portion 11a in a region surrounding the flat portion 11a (a region near the four sides or a region near the perimeter). As shown in FIG. 4, the height of the lower frame portion 11c as measured from the lower surface of the flat portion 11a is H2, which is greater than H1.

As shown in FIGS. 3 and 6, each portion of the lower frame portion 11c extending along the Y axis has a rectangular cross section having sides which are parallel to the X axis and the Z axis, respectively. A slit 11c1 extending along the Y axis (slit 11c1 whose longitudinal direction coincides with the Y axis direction) is formed in the portion of the lower frame portion 11c extending along the Y axis. The shape of the slit 11c1 as viewed from above is identical with that of the slit 11b1, except for the orientation of the longitudinal direction.

As shown in FIGS. 3 and 5, each portion of the lower frame portion 11c extending along the X axis has a rectangular cross section having sides which are parallel to the Y axis and the Z axis, respectively. This portion of the lower frame portion 11c extending along the X axis has the same shape as a part of the portion of the lower frame portion 11c extending along the Y axis, the part remaining after removal of an inner vertical wall part which partially forms the slit 11c1 from the lower frame portion 11c extending along the Y axis.

As a result, the slit 11b1 communicates with a space under the flat portion 11a, and the slit 11c1 communicates with a space above the flat portion 11a.

The support member 11 is configured as follows. When the support member 11 is rotated clockwise or counterclockwise by 90 degrees about the centroid G of the support member 11 (see FIG. 3) in the plan view, each portion of the upper frame portion 11b extending along the Y axis before the rotation coincides with a region which was occupied by an outer wall part of a corresponding portion of the upper frame portion 11b extending along the X axis before the rotation, the outer wall part partially forming the slit 11b1. Further, when the support member 11 is rotated clockwise or counterclockwise by 90 degrees about the centroid G of the support member 11 in the plan view, an outer wall part of each portion of the upper frame portion 11b extending along the X axis before the rotation, the outer wall part partially forming the slit 11b1, coincides with a region which was occupied by a corresponding portion of the upper frame portion 11b extending along the Y axis before the rotation.

Similarly, when the support member 11 is rotated clockwise or counterclockwise by 90 degrees about the centroid G of the support member 11 in the plan view, an outer wall part of each portion of the lower frame portion 11c extending along the Y axis before the rotation, the outer wall part partially forming the slit 11c1, coincides with a region which was occupied by a corresponding portion of the lower frame portion 11c extending along the X axis before the rotation. Further, when the support member 11 is rotated clockwise or counterclockwise by 90 degrees about the centroid G of the support member 11 in the plan view, each portion of the lower frame portion 11c extending along the X axis before the rotation coincides with a region which was occupied by an outer wall part of a corresponding portion of the lower frame portion 11c extending along the Y axis before the rotation, the outer wall part partially forming the slit 11c.

Figure 7:
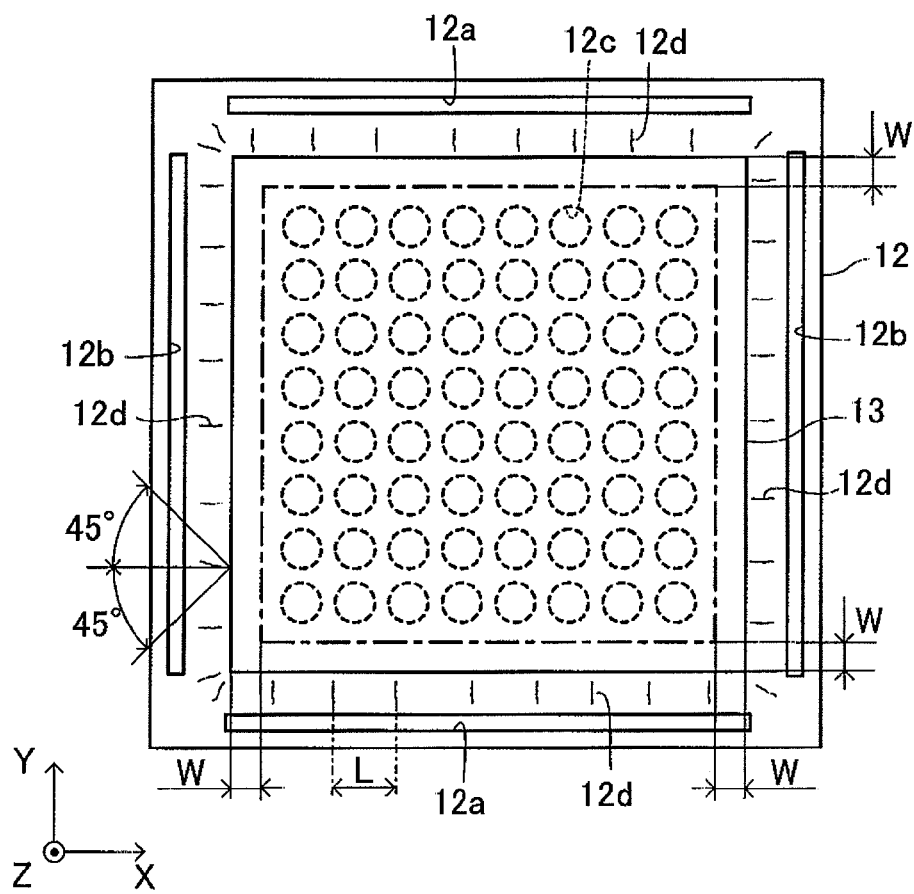
FIG. 7 is a plan view of a metal thin plate member and a ceramic thin plate member shown in FIG. 1.

Each metal thin plate member 12 is formed of stainless steel (e.g., SUS430). The metal thin plate member 12 is also called a "metal support plate." As shown in FIG. 7, which is a plan view of the metal thin plate member 12, the outer shape of the metal thin plate member 12 in the plan view is a square shape having sides which extend along the X-axis and Y-axis directions, respectively. The size of the metal thin plate member 12 in the plan view is identical with that of the support member 11. That is, the outer shape of the metal thin plate member 12 in the plan view is the same as that of the support member 11. The thickness direction of the metal thin plate member 12 coincides with the Z-axis direction. The metal thin plate member 12 has a thickness within a range of 20 μm to 80 μm inclusive.

The metal thin plate member 12 has slits 12a which are formed at positions corresponding to (positions coinciding, in the plan view, with) the slits 11b1 of the support member 11 and which have the same shape as the slits 11b1. Further, the metal thin plate member 12 has slits 12b which are formed at positions corresponding to (positions coinciding, in the plan view, with) the slits 11c1 of the support member 11 and which have the same shape as the slits 11c1. The metal thin plate member 12 has a plurality of through-holes 12c formed in a central portion thereof in a matrix pattern. The metal thin plate member 12 is formed such that even when the metal thin plate member 12 is rotated about the centroid thereof by 90 degrees, 180 degrees, or 270 degrees in the plan view, the metal thin plate member 12 maintains the same state (the positions of the slits and through-holes, etc.) as that before the rotation.

Figure 8:
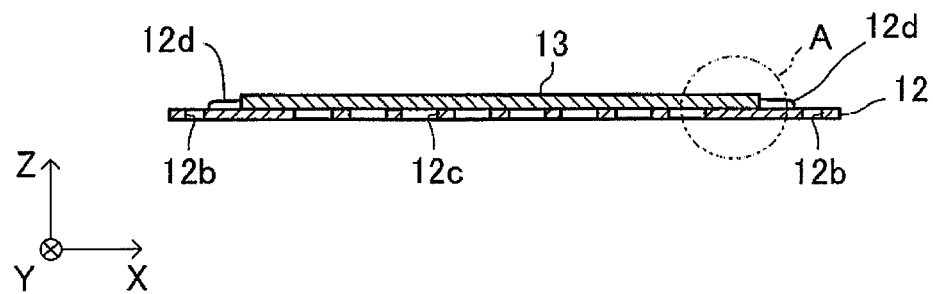
FIG. 8 is a cross-sectional view of the metal thin plate member and the ceramic thin plate member shown in FIG. 7.
Figure 9:
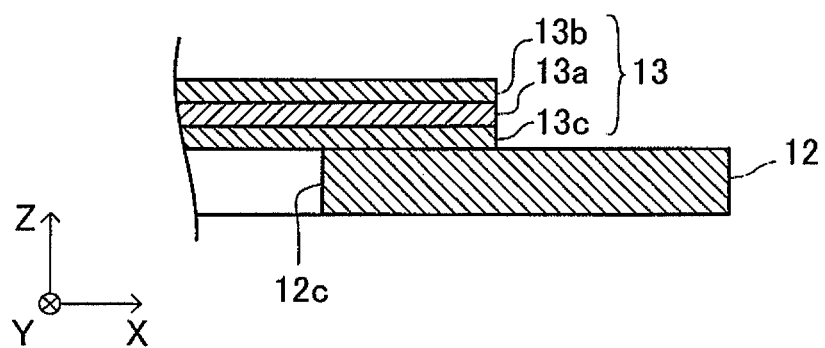
FIG. 9 is an enlarged fragmental cross-sectional view of the metal thin plate member and the ceramic thin plate member shown in FIG. 7.

As shown in FIG. 9, which is an enlarged view of a portion surrounded by circle A in FIG. 8, which is a cross sectional view of a metal thin plate member 12 and a corresponding ceramic thin plate member 13, the ceramic thin plate member 13 includes an electrolyte layer (solid electrolyte layer) 13a, a fuel electrode layer 13b formed on a surface (upper face or one face) of the electrolyte layer 13a, and an air electrode layer 13c formed on the surface (lower face or the other face) of the electrolyte layer 13a opposite to the fuel electrode layer 13b. The ceramic thin plate member 13 is also called a "single cell" of the fuel cell 10. As shown in FIG. 7, the shape of the ceramic thin plate member 13 in the plan view is a square shape having sides which extend along the X-axis and Y-axis directions, respectively. The size of the ceramic thin plate member 13 in the plan view is slightly smaller than that of the metal thin plate member 12 (that is, the shape of the ceramic thin plate member 13 in the plan view is a square shape slightly smaller than a square shape defined by the inner sides of the slits 12a and 12b). The thickness direction of the ceramic thin plate member 13 coincides with the Z-axis direction. The ceramic thin plate member 13 has a thickness within a range of 20 μm to 200 μm inclusive.

The lower surface of an outer circumferential portion of the ceramic thin plate member 13 is joined to the upper surface of the metal thin plate member 12 by means of glass or brazing filler metal. As shown in FIG. 7, the joint (or junction) portion has a constant width W. In a state after the ceramic thin plate member 13 and the metal thin plate member 12 are joined together, all the through-holes 12c of the metal thin plate member 12 are located under the ceramic thin plate member 13.

In the present example, the electrolyte layer 13a is a dense fired body of YSZ (yttria-stabilized zirconia), which serves as a ceramic sheet. The fuel electrode layer 13b is a porous fired body of Ni—YSZ. The air electrode layer 13c is a porous fired body of LSM (La(Sr)MnO$_3$: lanthanum strontium manganite)-YSZ. The electrolyte layer 13a, the fuel electrode layer 13b, and the air electrode layer 13c differ from one another in terms of coefficient of thermal expansion. Further, the ceramic thin plate member 13 differs in coefficient of thermal expansion from the metal thin plate member 12. Notably, their specific coefficients of thermal expansion are as follows. The electrolyte (YSZ): 10.8 ppm/K; the fuel electrode (Ni—YSZ): 11.4 ppm/K; the air electrode (LSM-YSZ): 10.6 ppm/K; and the metal thin plate member (SUS430): 12.1 ppm/K.

Figure 10:
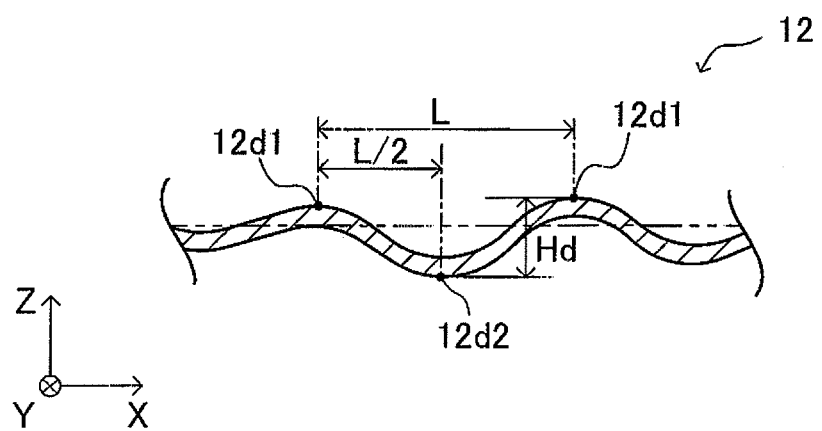
FIG. 10 is a fragmental cress-sectional view of a portion of the metal thin plate member taken along an X-Z plane, the portion being located between "a joint portion between the metal thin plate member and the ceramic thin plate member, the joint portion extending in the X-axis direction", and "a slit of the metal thin plate member adjacent to the joint portion"

A plurality of crease portions 12d are formed on the metal thin plate member 12 (i.e., the metal thin plate member 12 has a plurality of crease portions 12d). The crease portions 12d are formed between "the joint portion between the ceramic thin plate member 13 and the metal thin plate member 12" and "the outer circumferential portion of the metal thin plate member 12 (specifically, the slits 12a or 12b; more specifically, positions separated inwardly from the slits 12a or 12b by a predetermined distance) (see regions B of FIG. 2 each surrounded by an ellipse)". Each of the crease portions 12d has a crest (ridge portion) which continuously extends from the joint portion between the ceramic thin plate member 13 and the metal thin plate member 12 toward the outer circumferential portion of the metal thin plate member 12. That is, the ridge portion of each crease portion 12d extends at an angle of 45 degrees to 135 degrees inclusive, in relation to a tangential line (in the present example, a straight line extending along the X axis or the Y axis) of the outer circumferential edge of the ceramic thin plate member 13. The distance L between the crests of two crease portions adjacent to each other (the distance L between adjacent upper ridge portions 12d1; see FIG. 10) is within a range of 1 mm to 4 mm inclusive, as measured at a position 0.5 mm separated from the end portion of the ceramic thin plate member 13 toward the outer circumferential portion of the metal thin plate member 12. Further, the height Hd of the crease portions 12d, which is shown in FIG. 10 and is the vertical distance between an upper crest (upper ridge portion) 12d1 and a lower crest (lower ridge portion) 12d2 adjacent thereto, is within a range of 10 μm to 70 μm inclusive. It is noted that FIG. 10 is a fragmental cross-sectional view of a portion of the metal thin plate member 12 taken along an X-Z plane, the portion being located between "the joint portion between the metal thin plate member 12 and the ceramic thin plate member 13, the joint portion extending in the X-axis direction", and "the slit 12a of the metal thin plate member 12 adjacent to the joint portion".

Here, a method of forming the plurality of crease portions 12d will be described. The plurality of crease portions 12d are formed when the metal thin plate member 12 and the ceramic thin plate member 13 are joined together by use of glass or brazing filler metal. Specifically, glass (or brazing filler metal) is first placed at the above-described joint portion between the metal thin plate member 12 and the ceramic thin plate member 13. Subsequently, the metal thin plate member 12, the ceramic thin plate member 13, and the glass (or brazing filler metal) are heated to a predetermined high temperature (e.g., 980° C. which is higher than the melting point of the glass). At that time (i.e., while heating), the metal thin plate member 12 and the ceramic thin plate member 13 expand by respective amounts corresponding to their coefficients of thermal expansion.

Figure 11:
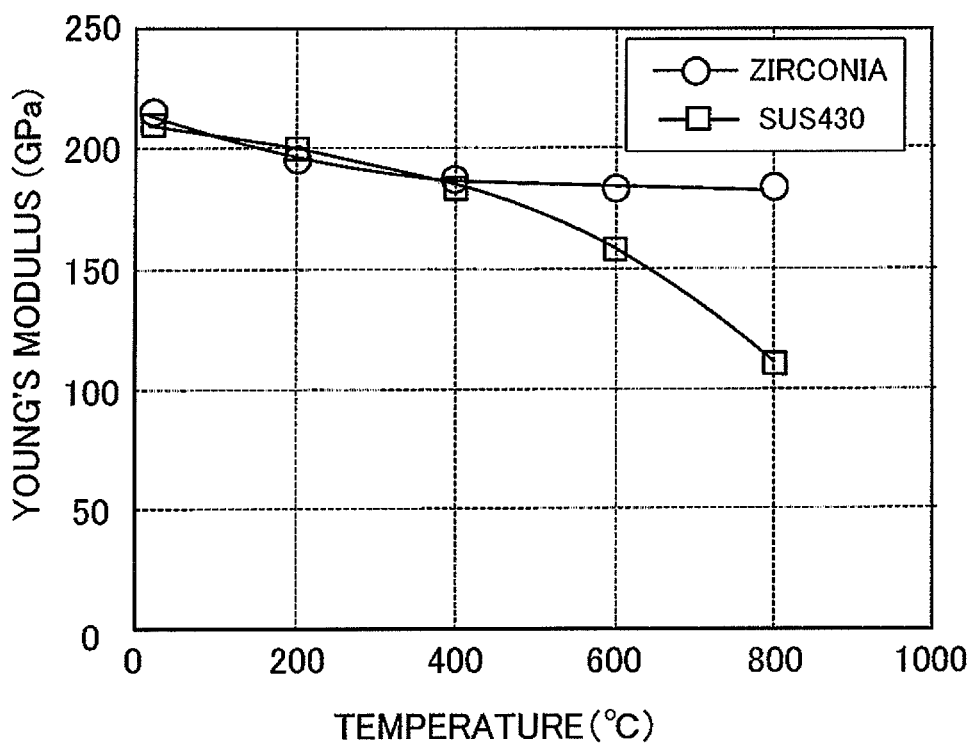
FIG. 11 is a graph showing the relation between temperature and Young's modulus for zirconia and SUS430.

The metal thin plate member 12 and the ceramic thin plate member 13, which are in an expanded state, are joined together through hardening of the glass (or brazing filler metal) when the temperature lowers. Since the metal thin plate member 12 and the ceramic thin plate member 13 contract by different amounts in response to the temperature decrease, a thermal stress is mainly generated at the joint portion between the two members. As a result, the metal thin plate member 12, which deforms more easily than the ceramic thin plate member 13, deforms greatly, so that the above-described plurality of crease portions 12d are formed on (or in, within) the metal thin plate member 12. Changes in Young's modulus of zirconia and SUS430 shown in FIG. 11 illustrate that, in a high temperature region, the metal thin plate member 12 (formed of, for example, SUS430) deforms more easily than the ceramic thin plate member 13 (formed of, for example, zirconia).

Accordingly, if the temperature of the device including the ceramic thin plate member 13 and the metal thin plate member 12 having the plurality of crease portions 12d formed as described above is increased from room temperature, a thermal stress generated due to the temperature increase is relaxed through expansion of a portion of the crease portions 12d. That is, the metal thin plate member 12 deforms such that it returns to the temperature-elevated state (heated state for the joining) before the joining process. As a result, even when the temperature of the device is repeatedly increased and decreased, no excessive thermal stress repeatedly acts on the joint portion and/or the ceramic thin plate member 13. Therefore, the device has a considerably high level of durability. It should be noted that, as is apparent from FIG. 11, the metal thin plate member 12 substantially deforms (a portion of the crease portions 12d expands) when the temperature of the device including the ceramic thin plate member 13 and the metal thin plate member 12 is elevated to 400° C. or higher.

As described above, "a plurality of support members 11" and "a plurality of metal thin plate members 12 each carrying the ceramic thin plate member 13 joined thereto (held thereon)" are alternately stacked (see FIGS. 1 and 2). Specifically, an outer circumferential portion (outer circumferential portion containing the slits 12a and 12b) of each metal thin plate member 12 is sandwiched between the upper surface of the upper frame portion 11b of one support member 11 (this will be called "first support member") and the lower surface of the lower frame portion 11c of another support member 11 (a support member having the same shape as the first support member and disposed above the first support member; this support member will be called "second support member"). At that time, the metal thin plate member 12 is fixed to the support members 11 (the first and second support members) via the glass. Accordingly, the metal thin plate members 12 and the support members 11 are insulated from each other. In an alternative method, an insulating film such as silica film or alumina film is formed on the surface of each metal thin plate member 12 (at regions to be joined) by means of, for example, sputtering, and then the metal thin plate members 12 and the support members 11 are joined together by use of brazing filler metal.

In the fuel cell 10 configured as described above, the fuel electrode layer 13b of each ceramic thin plate member 13 is disposed to face the lower surface of the flat portion 11a of the corresponding second support member; and the air electrode layer 13c of the ceramic thin plate member 13 is disposed to face the upper surface of the flat portion 11a of the corresponding first support member via the corresponding metal thin plate member 12 (through-holes 12c). The through-holes 12c formed in the metal thin plate member 12 prevent the metal thin plate member 12 from hindering supply of air (oxygen) to the air electrode layer 13c, and allow effective collection of electrons by portions of the metal thin plate member 12 other than (or except) the through-holes 12c. That is, a central portion of the metal thin plate member 12 serves as electricity collector means.

As indicated by solid arrows in FIGS. 1 and 2, air flows into the space above the flat portion 11a of each support member 11 via the slits 11c1 thereof. Accordingly, an air channel $C_{Air}$ is formed between the upper surface of the flat portion 11a of each support member 11 and the lower surface of the corresponding metal thin plate member 12. As a result, the air electrode layer 13c is always exposed to fresh air (oxygen) via the through-holes 12c. Meanwhile, fuel flows into the space under the flat portion 11a of each support member 11 via the slits 11b1 thereof. Accordingly, a fuel channel $C_{Fuel}$ is formed between the lower surface of the flat portion 11a of each support member 11 and the upper surface of the corresponding ceramic thin plate member 13. As a result, fresh fuel is supplied to the fuel electrode layer 13b. Thus, the fuel cell 10 generates electrical power in accordance with the above-described reaction formulas (1) and (2).

Figure 12:
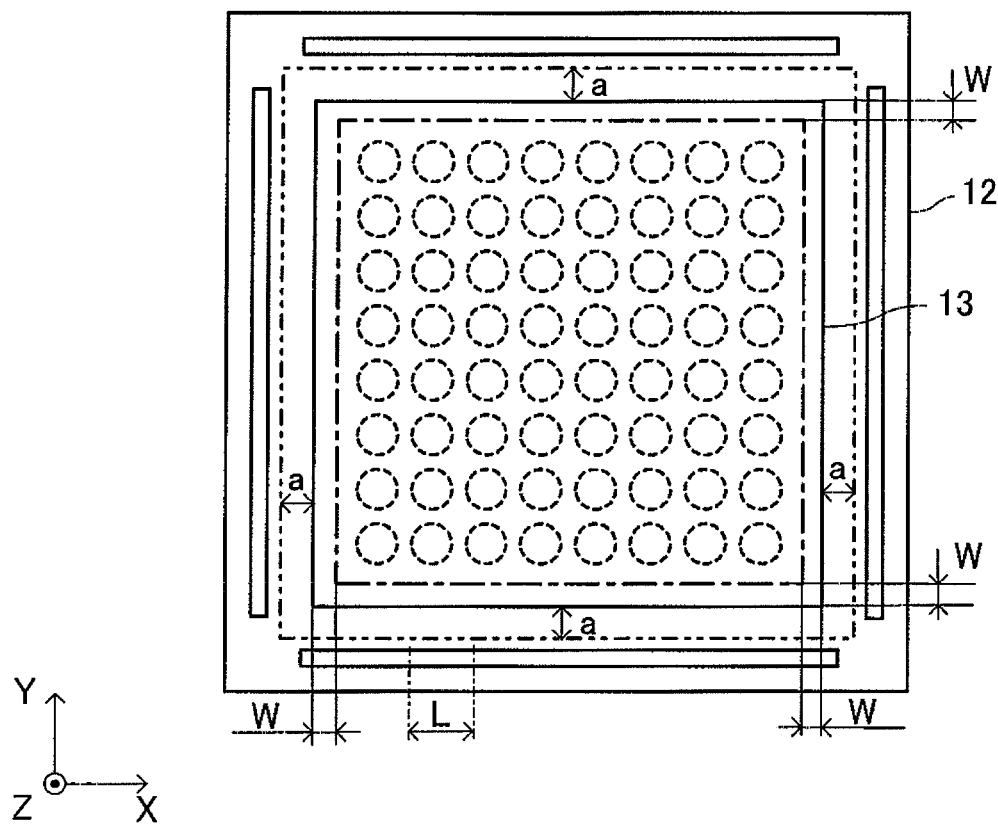
FIG. 12 is a plan view which shows a metal thin plate member and a ceramic thin plate member shown in FIG. 1 and which is used for describing the details of an experiment.

Studies for Preventing Deformation of Ceramic Thin Plate Member:

Next, there will be described results of experiments (first and second experiments) performed for properly forming the crease portions 12d in the vicinity of the outer circumferential portion of each metal thin plate member 12. In these experiments, there were used a support plate 11 which assumes a square shape in the plan view, and a metal thin plate member 12 and a ceramic thin plate member 13 which are shown in FIG. 12 and which assume a square shape in the plan view. The width "W" of the joint portion between the metal thin plate member 12 and the ceramic thin plate member 13 was set to 1 mm. The width "a" of a deformable region of the metal thin plate member 12 was set to 2 mm. Glass was used for joining the metal thin plate member 12 and the ceramic thin plate member 13 together. In joining, the metal thin plate member 12, the ceramic thin plate member 13, and the joining glass were heated to 980° C. in the atmosphere. They were allowed to stand for 30 minutes, and their temperatures were lowered so as to join the metal thin plate member 12 and the ceramic thin plate member 13 together. The glass used for joining contains $Li_2O$, $SiO_2$, and $Al_2O_3$ as predominant components. The glass has a glass transition temperature of 560° C. and a coefficient of thermal expansion of 10.5 ppm/K.

Table 1 shows the results of the first experiment performed for finding the optimal thickness of the ceramic thin plate member 13.

TABLE 1

| CERAMIC THIN PLATE MEMBER (μm) | STRUCTURE OF CERAMIC THIN PLATE MEMBER | | | METAL THIN PLATE MEMBER (μm) | WIDTH OF DEFORMABLE PORTION (mm) | NUMBER OF CREASES | CREASE HEIGHT (μm) | DEFORMATION OF CERAMIC THIN PLATE MEMBER (μm) | RESULTS |
|---|---|---|---|---|---|---|---|---|---|
| | AIR ELECTRODE | ZIRCONIA | FUEL ELECTRODE | | | | | | |
| 10 | — | 10 μm | — | 30 μm | 2 | — | — | — | R1 |
| 20 | — | 20 μm | — | 30 μm | 2 | 8 | 20 | 10 | R2 |
| 20 | 3 μm | 14 μm | 3 μm | 30 μm | 2 | 7 | 13 | 15 | R2 |
| 30 | — | 30 μm | — | 30 μm | 2 | 8 | 28 | 20 | R2 |
| 30 | 5 μm | 20 μm | 5 μm | 30 μm | 2 | 6 | 22 | 25 | R2 |
| 50 | — | 50 μm | — | 30 μm | 2 | 8 | 45 | 30 | R2 |
| 50 | 10 μm | 30 μm | 10 μm | 30 μm | 2 | 7 | 38 | 25 | R2 |
| 70 | 25 μm | 30 μm | 15 μm | 30 μm | 2 | 6 | 46 | 40 | R2 |
| 80 | 25 μm | 40 μm | 15 μm | 30 μm | 2 | 8 | 48 | 35 | R2 |
| 100 | 15 μm | 5 μm | 80 μm | 30 μm | 2 | 9 | 40 | 30 | R2 |
| 120 | 15 μm | 5 μm | 100 μm | 30 μm | 2 | 6 | 45 | 33 | R2 |
| 150 | 40 μm | 10 μm | 100 μm | 30 μm | 2 | 8 | 50 | 30 | R2 |
| 180 | 25 μm | 5 μm | 150 μm | 30 μm | 2 | 8 | 58 | 35 | R2 |
| 200 | 35 μm | 5 μm | 160 μm | 30 μm | 2 | 7 | 65 | 40 | R2 |
| 250 | — | 250 μm | — | 30 μm | 2 | 8 | 120 | 20 | R3 |
| 250 | 40 μm | 10 μm | 200 μm | 30 μm | 2 | 7 | 100 | 25 | R3 |
| 300 | — | 300 μm | — | 30 μm | 2 | 8 | 180 | 10 | R3 |
| 300 | 40 μm | 10 μm | 250 μm | 30 μm | 2 | 8 | 160 | 20 | R3 |

R1: CRACK GENERATED IN CERAMIC THIN PLATE MEMBER
R2: GOOD
R3: DEFORMATION (CREASES) OF METAL THIN PLATE MEMBER INCREASED (1) A ceramic thin plate member 13 composed of only a solid electrolyte layer (zirconia) has a higher Young's modulus (rigidity) and deforms less as compared with a "ceramic thin plate member 13 composed of a laminate which has the same thickness as the ceramic thin plate member 13 composed of only a solid electrolyte layer, the laminate including a solid electrolyte layer 13a, a fuel electrode layer 13b, and an air electrode layer 13c." Specifically, whereas the Young's modulus of zirconia, which is a ceramic, is about 200 GPa, the Young's modulus of the fuel electrode layer and the air electrode layer is 50 to 100 GPa. Accordingly, the Young's modulus of the entire laminate becomes lower than that of the zirconia by an amount corresponding to the thickness of each electrode layer. Therefore, in a device in which the ceramic thin plate member 13 composed of only a solid electrolyte layer is joined to a metal thin plate member 12, the metal thin plate member 12 was observed to deform by a greater amount as compared with a device in which the above-described laminate is joined to a metal thin plate member 12. However, when the thickness of the ceramic thin plate member 13 composed of only a solid electrolyte layer was less than 10 µm, a crack was generated in the ceramic thin plate member 13. Presumably, this phenomenon occurred for the following reason. Even when the ceramic thin plate member 13 is composed of a ceramic only, the excessively small thickness lowers its strength, so that the ceramic thin plate member 13 cannot endure the above-described thermal stress.

(2) When the thickness of the ceramic thin plate member 13 was within a range of 20 µm to 200 µm inclusive, the ceramic thin plate member 13 maintained the normal (proper) shape, and crease portions 12d were properly formed.

(3) When the thickness of the ceramic thin plate member 13 was 250 µm or higher, the metal thin plate member 12 deformed greatly, and excessively large crease portions (crease portions having excessively large heights) were formed on (or in) the metal thin plate member 12.

Table 2 shows the results of the second experiment performed for finding the optimal thickness of the metal thin plate member 12. Here, the thickness of the ceramic thin plate member 13 was constant (i.e., 30 µm).

(4) When the thickness of the metal thin plate member 12 was 20 µm or greater, the metal thin plate member 12 and the ceramic thin plate member 13 were properly joined together, and the metal thin plate member 12 had a proper shape. Although not shown in Table 2, when the thickness of the metal thin plate member 12 was 10 µm, the handling of the metal thin plate member 12 during manufacture was difficult, and thus, the ceramic thin plate member 13 was not able to be joined to the metal thin plate member 12. In some of the devices, the joining was able to be performed, however, the devices had a joint failure, and the sealing between metal thin plate member 12 and the ceramic thin plate member 13 was improper. Presumably, this result occurred because of the following reason. If the thickness of the metal thin plate member 12 is not greater than 10 µm, the strength of the metal thin plate member 12 is so low that it cannot maintain its shape. Therefore, the joint surface of the metal thin plate member 12 for joining with the ceramic thin plate member 13 is not maintained flat and smooth, so that a seal failure occurs.

(5) When the thickness of the metal thin plate member 12 was 100 µm or greater, the height of crease portions of the metal thin plate member 12 became excessively small, and it became difficult to suppress deformation of the ceramic thin plate member 13 stemming from thermal stress. Conceivably, this phenomenon occurred because the rigidity of the metal thin plate member 12 became excessive due to a large thickness of the metal thin plate member 12.

Further, the following findings were obtained through the first and second experiments.

(6) In each metal thin plate member 12 having proper crease portions 12d (crease portions 12d capable of suppressing deformation of the ceramic thin plate member 13 stemming from thermal stress), the height of the crease portions 12d was not greater than 70 µm (more preferably, not greater than 65 µm). Moreover, when the height of the crease portions 12d was 10 µm or less, the above-described effect of suppressing deformation of the ceramic thin plate member 13 was not observed.

(7) In each metal thin plate member 12 having proper crease portions 12d, "the distance L between the crests 12d1 of two crease portions adjacent to each other (see FIG. 10)" was in the range of 1 mm to 4 mm inclusive, as measured at a position 0.5 mm separated from the end portion of the ceramic thin plate member 13 toward the outer circumferential portion of the metal thin plate member 12 (a position separated from the outer circumferential edge of the ceramic thin plate member 13 or the joint portion by 0.5 mm along a direction normal (perpendicular) to the outer circumferential edge).

TABLE 2

| CERAMIC THIN PLATE MEMBER (µm) | STRUCTURE OF CERAMIC THIN PLATE MEMBER | | | METAL THIN PLATE MEMBER (µm) | WIDTH OF DEFORMABLE PORTION (mm) | NUMBER OF CREASES | CREASE HEIGHT (µm) | DEFORMATION OF CERAMIC THIN PLATE MEMBER (µm) | RESULTS |
|---|---|---|---|---|---|---|---|---|---|
| | AIR ELECTRODE | ZIRCONIA | FUEL ELECTRODE | | | | | | |
| 30 | — | 30 µm | — | 20 µm | 2 | 8 | 45 | 25 | R2 |
| 30 | 5 µm | 20 µm | 5 µm | 20 µm | 2 | 6 | 40 | 35 | R2 |
| 30 | — | 30 µm | — | 30 µm | 2 | 8 | 28 | 20 | R2 |
| 30 | 5 µm | 20 µm | 5 µm | 30 µm | 2 | 8 | 28 | 45 | R2 |
| 30 | — | 30 µm | — | 40 µm | 2 | 9 | 25 | 35 | R2 |
| 30 | 5 µm | 20 µm | 5 µm | 40 µm | 2 | 8 | 26 | 40 | R2 |
| 30 | — | 30 µm | — | 50 µm | 2 | 7 | 20 | 45 | R2 |
| 30 | 5 µm | 20 µm | 5 µm | 50 µm | 2 | 8 | 23 | 35 | R2 |
| 80 | — | 30 µm | — | 60 µm | 2 | 8 | 25 | 45 | R2 |
| 30 | 5 µm | 20 µm | 5 µm | 60 µm | 2 | 9 | 20 | 40 | R2 |
| 30 | — | 30 µm | — | 70 µm | 2 | 8 | 23 | 35 | R2 |
| 30 | 5 µm | 20 µm | 5 µm | 70 µm | 2 | 7 | 18 | 45 | R2 |
| 30 | — | 30 µm | — | 80 µm | 2 | 8 | 23 | 50 | R2 |
| 30 | 5 µm | 20 µm | 5 µm | 80 µm | 2 | 8 | 25 | 45 | R2 |
| 30 | — | 30 µm | — | 100 µm | 2 | 4 | 10 | 100 | R3 |
| 30 | 5 µm | 20 µm | 5 µm | 100 µm | 2 | 5 | 15 | 150 | R3 |
| 30 | — | 30 µm | — | 150 µm | 2 | 3 | 5 | 125 | R3 |
| 30 | 5 µm | 20 µm | 5 µm | 150 µm | 2 | 4 | 4 | 190 | R3 |

R1: CRACK GENERATED IN CERAMIC THIN PLATE MEMBER
R2: GOOD
R3: DEFORMATION (CREASES) OF METAL THIN PLATE MEMBER INCREASED (8) In each metal thin plate member 12 having proper crease portions 12d, the crest (ridge portion) of each crease portion 12d extended at an angle within a range of 45 degrees to 135 degrees inclusive in relation to the corresponding side of the ceramic thin plate member 13 (a corresponding tangential line of the outer circumferential edge of the ceramic thin plate member), except for the joint portion and regions near the corner portions of the ceramic thin plate member 13 and the metal thin plate member 12.

Confirmation of Effects:

The inventors further carried out the following tests so as to confirm the effects of the above-described embodiment.

<Effect Confirmation Test 1>

As a comparative example, a fuel cell was manufactured in which a ceramic thin plate member was directly sandwiched between support members 11 (interconnectors) formed of SUS430, without use of the metal thin plate member 12. In the comparative example, the ceramic thin plate member includes a zirconia layer, a fuel electrode layer formed on the front surfaces of the zirconia layer, and an air electrode layer formed on the reverse surfaces of the zirconia layer (the thickness of the fuel electrode layer=5 μm; the thickness of the zirconia layer=20 μm; the thickness of the air electrode layer=5 μm). In this case, the ceramic thin plate member received various stresses during the manufacture, and its central portion deformed into a convex shape. The deformation amount was 350 μm to 400 μm. Notably, the ceramic thin plate member had a square shape in the plan view; and the support members had a shape similar to that of support members 11 shown in FIG. 16, which will be described later (the support members had a square shape in the plan view).

Figure 13:
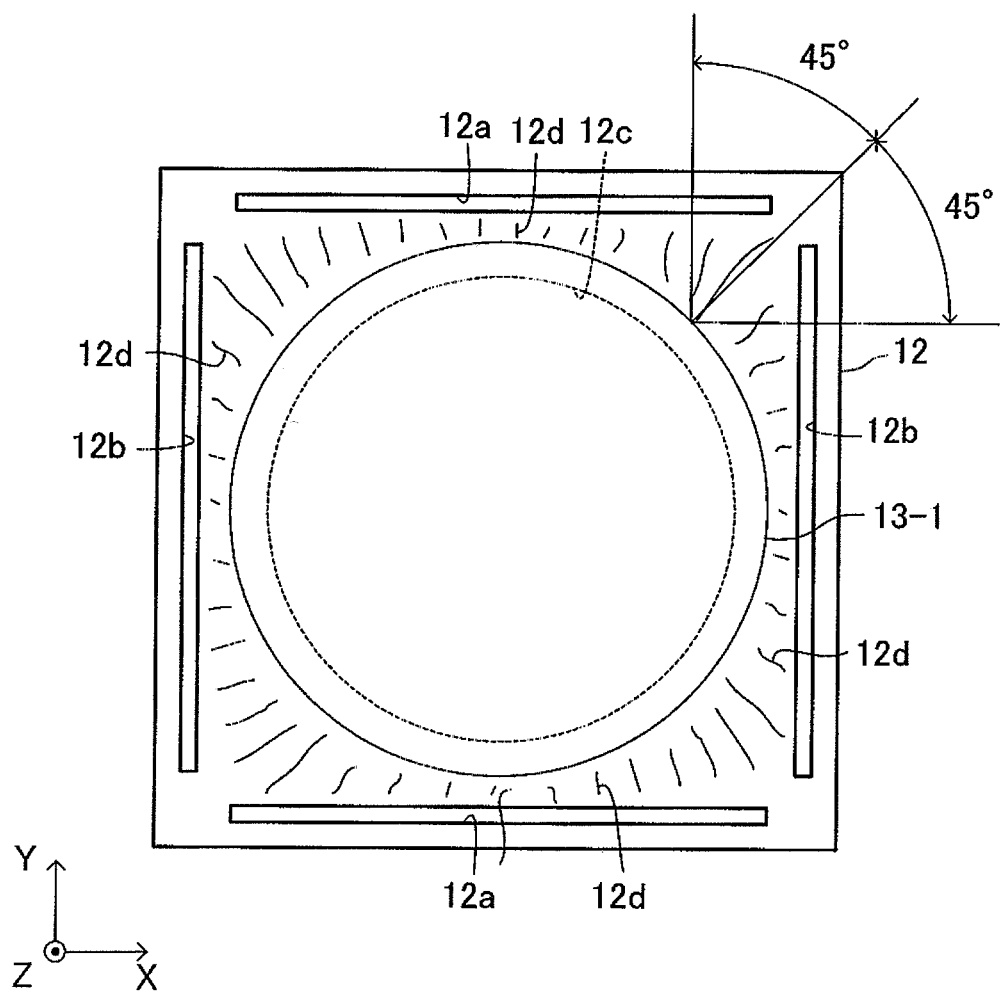
FIG. 13 is a plan view of a metal thin plate member and a ceramic thin plate member according to a modification of the embodiment of the present invention.

Separately, a fuel cell 10 was fabricated by making use of a device to which the present invention is applied (a device whose metal thin plate member has the above-described crease portions). Each metal thin plate member 12 used in the fabrication of the fuel cell had the above-described square shape in the plan view, as shown in FIG. 13. A ceramic thin plate member 13-1 shown in FIG. 13 was used in the fabrication of the fuel cell. The ceramic thin plate member 13-1 is formed of a zirconia layer having a thickness of 30 μm, and assumes a circular shape in the plan view. The support members used in the fabrication of the fuel cell are the same as those used in the fabrication of the comparative example. With the fuel cell fabricated in this manner, it was confirmed that the ceramic thin plate member 13-1 maintains a generally flat shape. From the above, it was confirmed that, in the device to which the present invention is applied, the ceramic thin plate member 13 hardly deforms.

<Effect Confirmation Test 2>

The fuel cell of the comparative example described above was heated from room temperature to 800° C. over a period of one minute by use of an infrared lamp to thereby increase the temperature of the fuel cell, and the fuel cell was cooled to room temperature over a period of one minute. As a result, a crack was generated in the ceramic thin plate member.

Separately, there was prepared an assembly in which the device of the above-described embodiment (including the square metal thin plate member 12 and the square ceramic thin plate member 13) was supported by support members similar to those used in the comparative example. The prepared assembly was heated and cooled under the same conditions as those for the comparative example. In this case, generation of a crack was not observed in the ceramic thin plate member 13 even after the heating and cooling cycle was repeated 10 times. That is, the ceramic thin plate member 13 did not break, and maintained its normal (or proper) shape.

Further, a similar heating/cooling test was performed for a device including a square metal thin plate member 12 and a circular ceramic thin plate member 13-1 as shown in FIG. 13. In this case, generation of a crack was not observed in the ceramic thin plate member 13-1 even after the heating and cooling cycle was repeated 10 times. This demonstrates that the device to which the present invention is applied exhibits excellent durability even when it is used in an environment in which heating and cooling are repeated, such as in the fuel cell 10.

The device according to the embodiment of the present invention has been described. In the device, even when a thermal stress is generated in a ceramic thin plate member 13 and/or a joint portion, such stress is relaxed by means of the crease portions 12d of a corresponding metal thin plate member 12. Further, the crease portions 12d also function as a rib for preventing the ceramic thin plate member 13 from moving or deforming (curving) in a direction perpendicular to the flat portion thereof. As a result of these, deformation of the ceramic thin plate member 13 in the direction perpendicular to the plane thereof is suppressed, so that the fuel cell 10 can exhibit a desired performance in a consistent manner.

Notably, the present invention is not limited to the above-described embodiment, and various modifications may be employed within the scope of the present invention. For example, the perimetric shape of each ceramic thin plate member in the plan view is not limited to the above-described square shape and circular shape, and may be an arbitrary shape, such as an elliptical shape, an oval shape, a polygonal shape (e.g., hexagon), or a polygonal shape with rounded corners.

Figure 14:
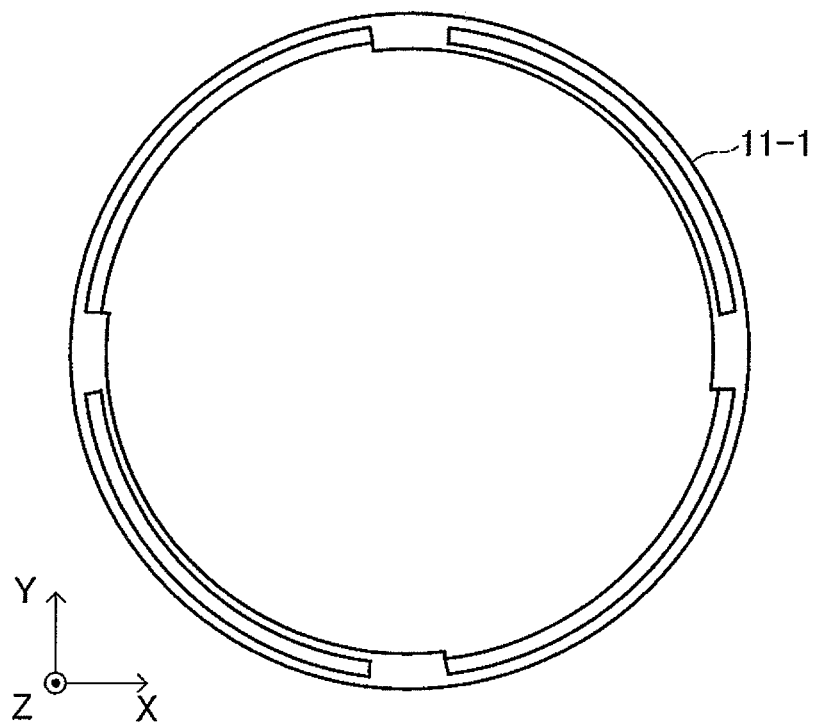
FIG. 14 is a plan view of a support member according to a modification of the embodiment of the present invention.

In addition, support members 11-1 which assume a circular shape in the plan view as shown in FIG. 14 may be used in place of the support members 11. Further, irrespective of the perimetric shape of each ceramic thin plate member, each metal thin plate member may have an arbitrary perimetric shape in the plan view; such as a square shape, a circular shape, an elliptical shape, an oval shape, a polygonal shape (e.g., hexagonal or octagon), or a polygonal shape with rounded corners. The support members 11 are only required to have a planar shape (a shape in the plan view) corresponding to the planar shape of each metal thin plate member.

Each metal thin plate member 12 may have a single large through-hole in a region inside the joint portion between the metal thin plate member 12 and the corresponding ceramic thin plate member 13. In this case, the metal thin plate member 12 can be referred to as a "frame of metal thin plate," reflecting its actual function. Further, the metal thin plate member 12 may be configured such that a separate member (preferably, an electrically conductive member of metal or the like) having a mesh structure or having a plurality of through-holes is disposed to cover the single through-hole and held by the metal thin plate member 12.

Figure 15:
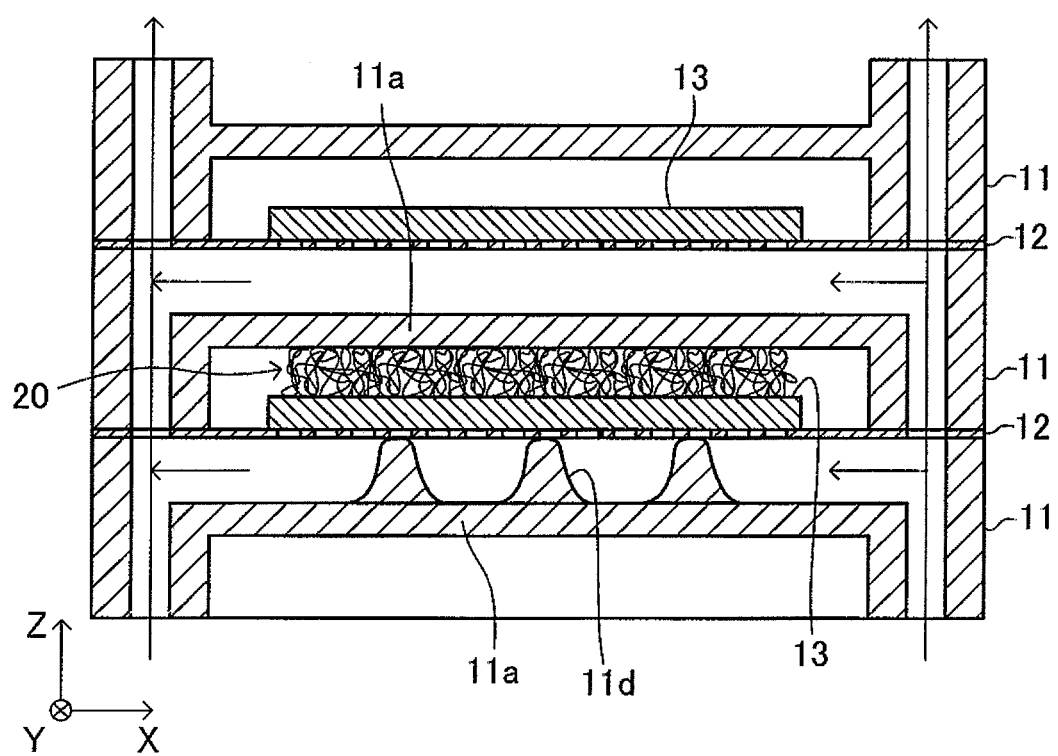
FIG. 15 is a partial vertical cross-sectional view of a fuel cell equipped with electricity collector means, which is a modification of the fuel cell shown in FIG. 1.

Moreover, as shown in FIG. 15, a plurality of projections 11d may be formed on the upper surface and/or the lower surface of the flat portion 11a of a support member 11. The projections 11d are formed to project upward from the flat portion 11a and come into contact with the lower surface of a corresponding metal thin plate member 12. Alternatively, the projections 11d may be formed to project downward from the flat portion 11a and come into contact with the upper surface of a corresponding ceramic thin plate member 13. The projections 11d function as an electricity collector terminal (electricity collector means) for collecting electrons.

Figure 16:
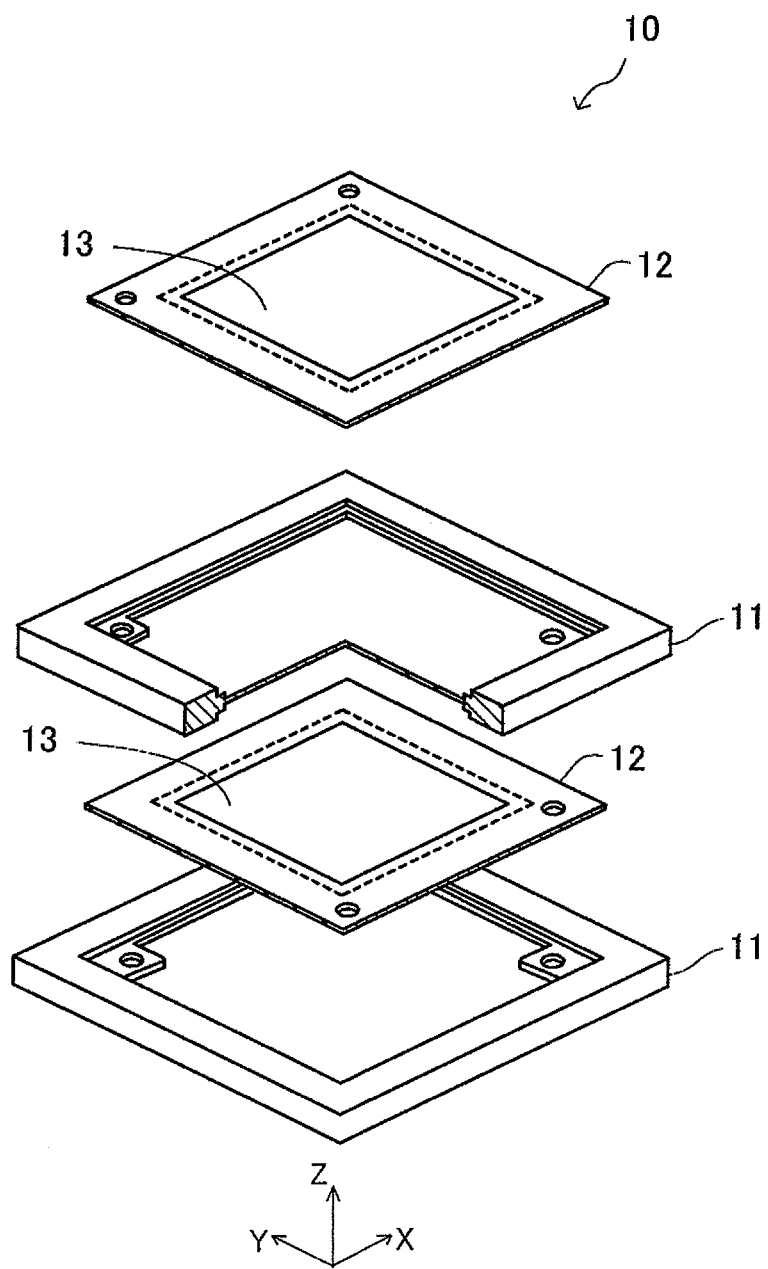
FIG. 16 is a partially exploded perspective view of another solid oxide fuel cell which includes a device according to the embodiment of the present invention.

Furthermore, as shown in FIG. 15, a metal mesh 20 may be inserted between the lower surface of a flat portion 11a and the upper surface of a corresponding ceramic thin plate member 13 or between the upper surface of the flat portion 11a and the lower surface of a corresponding metal thin plate member 12. This metal mesh 20 also serves as the electricity collector means which has an electricity collecting function. Moreover, the present invention can be applied to a device which includes support members 11, metal thin plate members 12, and ceramic thin plate members 13 modified as shown in FIG. 16. In addition, the fuel electrode layer 13b of each ceramic thin plate member 13 may be joined to the surface of a corresponding metal thin plate member 12, or the air electrode layer 13c thereof may be joined to the surface of the metal thin plate member 12.

The fuel electrode layer 13b may be formed of platinum, platinum-zirconia cermet, platinum-cerium oxide cermet, ruthenium, ruthenium-zirconia cermet, or the like.

Moreover, the air electrode layer 13c may be formed of, for example, a perovskite composite oxide containing lanthanum (e.g., the above-described lanthanum manganite or lanthanum cobaltite). The lanthanum cobaltite and lanthanum manganite may be those doped with strontium, calcium, chromium, cobalt (for the case of lanthanum manganite), iron, nickel, aluminum, or the like. Further, the air electrode layer 13c may be formed of palladium, platinum, ruthenium, platinum-zirconia cermet, palladium-zirconia cermet, ruthenium-zirconia cermet, platinum-cerium oxide cermet, palladium-cerium oxide cermet, or ruthenium-cerium oxide cermet. Further, each ceramic thin plate member 13 is a laminate of three layers; however, it may be composed of a single ceramic layer or a laminate including two layers or four layers or more (e.g., four to seven layers).

Although the device of the above-described embodiment is applied to the fuel cell 10, the device may be applied to a sensor, an actuator, or the like. That is, for example, the device according to the present invention may be used in a thermoelectric gas sensor as described below.

Figure 17:
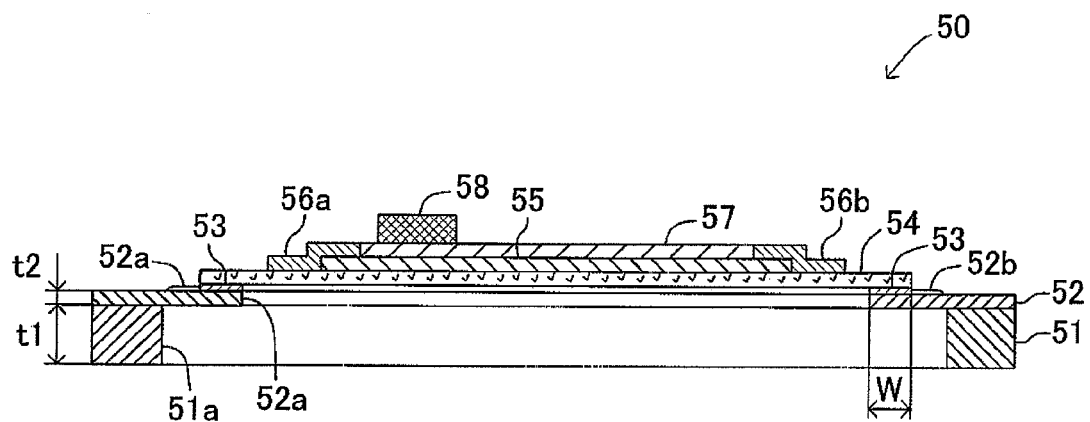
FIG. 17 is a vertical cross-sectional view of a thermoelectric gas sensor which includes a device according to the embodiment of the present invention.

A thermoelectric gas sensor 50, whose vertical cross section is shown in FIG. 17, includes a metal substrate 51, a metal thin plate member 52, glass 53, a ceramic thin plate member 54, a thermoelectric film 55, a first electrode 56a, a second electrode 56b, a protection film 57, and a catalyst 58.

The metal substrate 51 is formed of stainless steel (e.g., SUS430), but is not limited thereto. The metal substrate 51 is a frame having a predetermined thickness t1. The metal substrate 51 has a rectangular outer shape as viewed in its plan view. In other words, the metal substrate 51 has a rectangular through-hole 51a at the center thereof. The through-hole 51a is smaller than the outer shape of the metal substrate 51 in the plan view. Notably, the outer shape of the metal substrate 51 by a certain length and the through-hole 51a in the plan view is not limited to the rectangular shape, and may be of any other shape, such as a square shape or a circular shape.

The metal thin plate member 52 is formed of stainless steel (e.g., SUS430), but is not limited thereto. The metal thin plate member 52 is fixed to the upper surface of the metal substrate 51 by means of adhesive (alternatively, glass, brazing filler metal, and the like). The metal thin plate member 52 is a thin plate member having a predetermined thickness t2. The thickness t2 is smaller than the thickness t1. The outer shape of the metal thin plate member 52 as viewed in its plan view is a rectangular shape identical with that of the metal substrate 51. The metal thin plate member 52 has a rectangular through-hole 52a at the center thereof. The through-hole 52a is smaller than the outer shape of the metal thin plate member 52 by another certain length in the plan view. The through-hole 52a is smaller than the through-hole 51a. Accordingly, the metal thin plate member 52 is supported by and fixed to the metal substrate 51 at an outer circumferential portion thereof, and is free at an inner portion thereof. Notably, the outer shape of the metal thin plate member 52 and the through-hole 52a in the plan view is not limited to the rectangular shape, and may be of any other shape, such as a square shape or a circular shape, depending on the outer shape, in the plan view, of the metal substrate 51 and the through-hole 51a. The metal thin plate member 52 has a plurality of crease portions 52b, which are similar to the plurality of crease portions 12d shown in FIG. 7. The ridge portions of the crease portions 52b are formed to extend radially such that each ridge portion has a component along a direction extending from the centroid of the metal thin plate member 52 to the outside.

The ceramic thin plate member 54 is a flat plate formed of zirconia (zirconia substrate), but is not limited thereto. The ceramic thin plate member 54 has a thickness similar to that of the metal thin plate member 52. The outer shape of the ceramic thin plate member 54 is similar (homothetic) rectangular of the outer shape of the metal substrate 51 and the metal thin plate member 52. In the plan view, the sides of the ceramic thin plate member 54 are located between the sides of the through-hole 51a and the sides of the through-hole 52a. In other words, in the plan view, an outer circumferential portion of the ceramic thin plate member 54 overlaps an inner circumferential portion of the metal thin plate member 52 in a region extending inward from the outer edge of the ceramic thin plate member 54 over a certain distance W. This overlap portion will be referred to as a joint potion. At the joint portion, the ceramic thin plate member 54 is joined to the metal thin plate member 52 by means of the glass 53 disposed between the upper surface of the metal thin plate member 52 and the lower surface of the ceramic thin plate member 54. Accordingly, the ridge portions of the crease portions 52b of the metal thin plate member 52 extend (radially) in directions each having an angle of 45 degree to 135 degrees inclusive, in relation to a tangential line of the outer edge of the ceramic thin plate member 54. Notably, the outer shape of the ceramic thin plate member 54 in the plan view is not limited to the rectangular shape, and may be of any other shape, such as a square shape or a circular shape, depending on the outer shape of the metal substrate 51 and the metal thin plate member 52.

The thermoelectric film 55 is a thin film which has a function of converting a temperature difference, which is produced within the thermoelectric film 55 by a heat transmitted thereto, to a voltage signal by means of a "thermoelectric conversion effect." The thermoelectric film 55 is formed of, for example, a cobalt oxide ($NaCO_2O_4$), but is not limited thereto. As described above, the thermoelectric film 55 is desirably an oxide which exhibits the thermoelectric conversion effect. The thermoelectric film 55 may be formed of SiGe, $Bi_2Te_3$, FeSi, or the like. Further, thermoelectric film 55 may be subjected to crystalline orientation so as to enhance its capability.

The first electrode 56a is formed on the upper surface of the ceramic thin plate member 54 and on the upper surface of the thermoelectric film 55 so as to cover one end portion of the thermoelectric film 55. The first electrode 56a is a thin film formed of platinum (or an alloy of platinum and titanium). The first electrode 56a is electrically connected to the thermoelectric film 55.

The second electrode 56b is formed on the upper surface of the ceramic thin plate member 54 and on the upper surface of the thermoelectric film 55 so as to cover the other end portion of the thermoelectric film 55. The second electrode 56b is a thin film formed of platinum (or an alloy of platinum and titanium). The second electrode 56b is electrically connected to the thermoelectric film 55. That is, in order to obtain a voltage generated in the thermoelectric film 55, the first electrode 56a and the second electrode 56b are formed in the vicinities of the opposite end portions of the thermoelectric film 55.

The protection film 57 is formed of silicon oxide film ($SiO_2$), but is not limited thereto. The protection film 57 covers a central portion of the upper surface of the thermoelectric film 55, which portion is not covered by "the first electrode 56a and the second electrode 56b".

The catalyst 58 is a film of a catalytic material which causes a catalytic reaction upon contact with a flammable gas and generates heat through the catalytic reaction. In the present example, in order to enable the thermoelectric gas sensor 50 to detect hydrogen, a noble-metal-base porous material (e.g., platinum) which causes a catalytic reaction upon contact with hydrogen is used for the catalyst 58. The material of the catalyst 58 is properly selected in accordance with a flammable gas whose concentration is to be detected. The catalyst 58 is formed immediately above the thermoelectric film 55 at a predetermined position. Specifically, in the plan view, the catalyst 58 is formed at a position outside a central portion of the thermoelectric film 55, the position being closer to the first electrode 56a than to the second electrode 56b.

In the thermoelectric gas sensor 50 configured as described above, heat generated through a catalytic reaction between the catalyst 58 and a flammable gas (in the present example, hydrogen) is transmitted to the thermoelectric film 55. As a result, a "temperature difference (temperature distribution)" is generated within the thermoelectric film 55 such that the temperature of the first electrode 56a becomes higher than that of the second electrode 56b. The higher the concentration of the flammable gas coming into contact with the catalyst 58 becomes, the greater the amount of heat generated by the catalyst 58 becomes. Therefore, the higher the concentration of the flammable gas becomes, the greater the "temperature difference" becomes. This temperature difference is converted to a voltage by means of the thermoelectric conversion effect of the thermoelectric film 55. The greater the temperature difference within the thermoelectric film 55 becomes, the higher the voltage produced by the thermoelectric conversion effect of the thermoelectric film 55 becomes. As a result, the higher the concentration of the flammable gas becomes, the higher the voltage generated by the thermoelectric film 55 becomes. This voltage is taken out from the first electrode 56a and the second electrode 56b as a detection output of the thermoelectric gas sensor 50.

As described above, in the thermoelectric gas sensor 50, the thermoelectric film 55 is formed on the upper surface of the ceramic thin plate member 54. The lower surface of the ceramic thin plate member 54 is exposed to an open space via the through-hole 52a and the through-hole 51a. Accordingly, heat is efficiently radiated from the lower surface of the ceramic thin plate member 54, and the ceramic thin plate member 54 does not receive heat from other portions of the thermoelectric gas sensor 50. Further, the ceramic thin plate member 54 is formed of a zirconia ($ZrO_2$) substrate. The zirconia substrate has a very low heat conductivity as compared with silicon nitride ($Si_3N_4$) used, for example, when manufacture is performed by means of an MEMS process. That is, whereas the heat conductivity of $Si_3N_4$ is 29.3 W/mK, the heat conductivity of $ZrO_2$ is 1.7 W/mK. By virtue of the above-described configuration, a "large temperature difference corresponding to the concentration of a flammable gas (a temperature difference sensitively changing in accordance with the concentration of the flammable gas)" can be generated within the thermoelectric film 55. Accordingly, the sensitivity of the thermoelectric gas sensor 50 can be improved greatly.

When the thermoelectric film 55 is formed of an oxide material such as the above-described cobalt oxide, it is possible to form a green film (a file before firing), which is to become the thermoelectric film 55, the first electrode 56a, the second electrode 56b, etc. on a green plate (a plate before firing), which is to be become the ceramic thin plate member 54, and to fire them simultaneously. Accordingly, the reliability of the thermoelectric gas sensor 50 can be enhanced.

As described above, the device of the present invention can be suitably applied to the thermoelectric gas sensor 50. Notably, in place of the glass 53, brazing filler metal may be used as a bonding material. In this case, desirably, after an insulating film (e.g., silica film or alumina film) is formed on the surface of the metal thin plate member 52 through, for example, sputtering, the metal thin plate member 52 and the ceramic thin plate member 54 are joined together by the brazing filler metal. Further, although the metal thin plate member 52 has the crease portions 52b, in some cases, the crease portions 52b may be omitted depending on the required performance of the thermoelectric gas sensor 50. Furthermore, a heater (e.g., platinum heater) is desirably formed on the lower surface of the catalyst 58 while being insulated from the first electrode 56a, the second electrode 56b, etc., so as to maintain the temperature of the catalyst 58 at a proper activation temperature.

What is claimed is:

1. A solid oxide fuel cell comprising:
    a ceramic thin plate member including a fired ceramic sheet; and
    a metal thin plate member having an outer shape larger than that of the ceramic thin plate member;
    wherein an outer circumferential portion of the ceramic thin plate member is joined to the metal thin plate member, and the metal thin plate member has a plurality of discrete creases, each discrete crease protruding from a surface of the thin metal plate to define a ridge portion whose crest continuously extends radially from a joint portion between the ceramic thin plate member and the metal thin plate member toward an outer circumferential portion of the metal thin plate member.

2. A solid oxide fuel cell according to claim 1, wherein when the device is heated, the discrete creases partially expand, whereby the metal thin plate member deforms such that it returns to a heated state before the metal thin plate member was joined to the ceramic thin plate member.

3. A solid oxide fuel cell according to claim 2, wherein when the device is heated to 400° C. or higher, the metal thin plate member causes the deformation.

4. A solid oxide fuel cell according to claim 1, wherein the metal thin plate member includes a single or a plurality of through-holes in a region located inside the joint portion between the ceramic thin plate member and the metal thin plate member.

5. A solid oxide fuel cell according to claim 1, wherein the ridge portion of each discrete crease extends at an angle within a range of 45 degrees to 135 degrees inclusive in relation to a corresponding tangential line of an outer circumferential edge of the ceramic thin plate member.

6. A solid oxide fuel cell according to claim 5, wherein the ceramic thin plate member has a thickness within a range of 20 µm to 200 µm inclusive, and the metal thin plate member has a thickness within a range of 20 µm to 80 µm inclusive.

7. A solid oxide fuel cell according to claim 6, wherein a crease height, which is a vertical distance between an upper crest of a discrete crease and a lower crest adjacent thereto, is within a range of 10 µm to 70 µm inclusive.

8. A solid oxide fuel cell according to claim 7, wherein the distance between the crests of two discrete creases adjacent to each other is within a range of 1 mm to 4 mm inclusive, as measured at a position 0.5 mm separated from an end portion of the ceramic thin plate member toward the outer circumferential portion of the metal thin plate member.

9. A solid oxide fuel cell according to claim 1, wherein the metal thin plate member and the outer circumferential portion of the ceramic thin plate member are joined by use of glass or brazing filler metal.

10. A solid oxide fuel cell according to claim 1, wherein the ceramic thin plate member is a single-layer thin plate or a laminate including a plurality of thin plates.

11. A solid oxide fuel cell according to claim 1, wherein the ceramic thin plate member is a laminate including the ceramic sheet and additional sheet formed of a material having a coefficient of thermal expansion different from that of the ceramic sheet.

12. A solid oxide fuel cell according to claim 11, wherein the ceramic thin plate member includes:
- a solid electrolyte layer serving as the ceramic sheet;
- a fuel electrode layer formed on one face of the solid electrolyte layer and serving as the additional sheet; and
- an air electrode layer formed on the opposite face of the solid electrolyte layer and serving as the other additional sheet.

13. A solid oxide fuel cell according to claim 12, further comprising:
- a first support member having a flat portion, an upper frame portion projecting toward the upper side of the flat portion and surrounding the flat portion, and a lower frame portion projecting toward the lower side of the flat portion and surrounding the flat portion;
- a second support member having a flat portion, an upper frame portion projecting toward the upper side of the flat portion and surrounding the flat portion, and a lower frame portion projecting toward the lower side of the flat portion and surrounding the flat portion, wherein
- the first and second support members are disposed and aligned coaxially to each other such that the lower frame portion of the second support member is located above the upper frame portion of the first support member and faces the upper frame portion;
- the metal thin plate member is sandwiched between the upper frame portion of the first support member and the lower frame portion of the second support member so that the air electrode layer of the ceramic thin plate member faces an upper surface of the flat portion of the first support member and the fuel electrode layer of the ceramic thin plate member faces a lower surface of the flat portion of the second support member;
- the upper surface of the flat portion of the first support member, an inner wall surface of the upper frame portion of the first support member, and the air electrode layer of the ceramic thin plate member define an air channel to which a gas containing oxygen is supplied; and
- the lower surface of the flat portion of the second support member, an inner wall surface of the lower frame portion of the second support member, and the fuel electrode layer of the ceramic thin plate member define a fuel channel to which a fuel is supplied.

* * * * *